(12) United States Patent
Nagai (10) Patent No.: US 9,308,943 B2
(45) Date of Patent: Apr. 12, 2016

(54) INSTRUMENT PANEL STRUCTURE

(75) Inventor: Hiromi Nagai, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/234,496

(22) PCT Filed: Aug. 1, 2011

(86) PCT No.: PCT/JP2011/067623
§ 371 (c)(1),
(2), (4) Date: Mar. 7, 2014

(87) PCT Pub. No.: WO2013/018191
PCT Pub. Date: Feb. 7, 2013

(65) Prior Publication Data
US 2014/0232140 A1    Aug. 21, 2014

(51) Int. Cl.
*B62D 25/14*     (2006.01)
*B60K 37/00*     (2006.01)
*B60R 11/02*     (2006.01)
*B60K 35/00*     (2006.01)
*B60R 11/00*     (2006.01)

(52) U.S. Cl.
CPC .............. *B62D 25/145* (2013.01); *B60K 35/00* (2013.01); *B60K 37/00* (2013.01); *B60R 11/0235* (2013.01); *B62D 25/142* (2013.01); *B60K 2350/106* (2013.01); *B60K 2350/401* (2013.01); *B60K 2350/941* (2013.01); *B60R 2011/0047* (2013.01)

(58) Field of Classification Search
CPC .... B62D 25/145; B62D 25/142; B60K 37/00; B60K 2350/106; B60K 2350/401; B60K 2350/941; B60R 11/0235; B60R 2011/0047

USPC .......................................................... 296/70
See application file for complete search history.

(56) References Cited

U.S. PATENT DOCUMENTS 4,604,946 A * 8/1986 Watanabe ..................... 454/127
6,196,588 B1   3/2001 Sugawara
(Continued)

FOREIGN PATENT DOCUMENTS

EM    1 338 494 A2    8/2003
JP    5-42854         2/1993
(Continued)

OTHER PUBLICATIONS

International Search Report issued Oct. 18, 2011, in PCT/JP2011/067623, filed Aug. 1, 2011.
(Continued)

*Primary Examiner* — Glenn Dayoan
*Assistant Examiner* — Melissa A Black
(74) *Attorney, Agent, or Firm* — Oblon, McClelland, Maier & Neustadt, L.L.P.

(57) ABSTRACT

Supporting members are provided between an instrument panel reinforcement and a display, and the supporting members and a duct are set so as to overlap as seen in side view. Further, at the duct, a through-hole through which the supporting member passes is formed in a duct portion, and a through-hole through which the supporting member passes is formed in a duct portion. Therefore, due to the supporting members, that support the display, being passed-through the duct portion, the supporting members are provided so as to overlap the duct as seen in plan view.

5 Claims, 6 Drawing Sheets

(56) References Cited

U.S. PATENT DOCUMENTS

| | | | |
|---|---|---|---|
| 6,802,559 B2 * | 10/2004 | Yoshihara et al. | ............ 296/208 |
| 2003/0155793 A1 | 8/2003 | Yoshihara et al. | |

FOREIGN PATENT DOCUMENTS

| | | |
|---|---|---|
| JP | 11-157364 | 6/1999 |
| JP | 11-255000 | 9/1999 |
| JP | 2003-205765 | 7/2003 |
| JP | 2003-205766 | 7/2003 |
| JP | 2004-291744 | 10/2004 |
| JP | 2005-75087 | 3/2005 |
| JP | 2007-269231 | 10/2007 |
| JP | 4064673 | 3/2008 |

OTHER PUBLICATIONS

Extended European Search Report issued Sep. 24, 2014 in Patent Application No. 11870199.4.

* cited by examiner

INSTRUMENT PANEL STRUCTURE

TECHNICAL FIELD

The present invention relates to an instrument panel structure.

BACKGROUND ART

In Patent Document 1, there is disclosed an instrument panel structure in which a bracket (supporting member) is connected to a pillar-to-pillar member (instrument panel reinforcement) that serves as a strength member that extends in the vehicle transverse direction, and an in-vehicle electronic apparatus (a display) is supported by this bracket. Note that, in addition thereto, instrument panel structures are disclosed in Patent Documents 2 through 4.

[Patent Document 1] Japanese Patent No. 4064673
[Patent Document 2] Japanese Patent Application Laid-Open (JP-A) No. 2004-291744
[Patent Document 3] JP-A No. 2007-269231
[Patent Document 4] JP-A No. H05-042854

DISCLOSURE OF INVENTION

Technical Problem

However, in the invention recited in Patent Document 1, two air ducts are disposed between the pillar-to-pillar member and the in-vehicle electronic apparatus as seen in side view, and therefore, the bracket that connects the pillar-to-pillar member and the in-vehicle electronic apparatus is disposed between these two air ducts. Thus, there is the possibility that the air ducts will widen in the vehicle transverse direction and the ability to efficiently utilize space will deteriorate.

The present invention was made in consideration of the above-described topic, and an object thereof is to provide an instrument panel structure that can suppress a deterioration in the ability to efficiently utilize space.

Solution to Problem

A first aspect of the present invention provides an instrument panel structure comprising: an instrument panel reinforcement that is provided at a reverse side of an instrument panel, and that extends along a vehicle transverse direction; a supporting member that supports a display disposed at an upper surface of the instrument panel, and that is disposed at a central portion in the vehicle transverse direction of the instrument panel reinforcement; and a duct that connects an air conditioner provided at the reverse side of the instrument panel and a register provided at the instrument panel, and that is positioned between the instrument panel reinforcement and the display and overlaps the supporting member as seen in side view, the supporting member being provided rectilinearly such that at least a part thereof overlaps the duct as seen in plan view and at which a through-hole through which the supporting member passes is formed in a duct main body.

In the above-described aspect, the instrument panel reinforcement that extends along the vehicle transverse direction is provided at the reverse side of the instrument panel. A supporting member, that supports a display that is disposed at the upper surface of the instrument panel, is fixed to the central portion in the vehicle transverse direction of this instrument panel reinforcement.

Generally, the instrument panel reinforcement is formed by a member that has high strength and rigidity. Therefore, due to the display being supported by a supporting member that is fixed to this instrument panel reinforcement, the display can be supported sufficiently even if the display is made to be large and the mass thereof becomes large. Further, the air conditioner is provided at the reverse side of the instrument panel, and this air conditioner and a register, that is provided at the instrument panel, are connected by a duct. Due thereto, air that is fed-out from the air conditioner passes-through the duct and is blown-out from the register.

Here, the duct is positioned between the instrument panel reinforcement and the display. The display is supported by the instrument panel reinforcement via the supporting member. Therefore, the supporting member is provided between the instrument panel reinforcement and the display, and the supporting member and the duct are set so as to overlap as seen in side view. Moreover, this supporting member is provided in a rectilinear shape so as to overlap the duct as seen in plan view.

Namely, the supporting member must come-out upward from beneath the duct. Therefore, for example, at the central portion in the vehicle transverse direction of the duct, a through-hole through which the supporting member passes is formed in this duct main body. Accordingly, in accordance with the above-described aspect, the ability to efficiently utilize space improves as compared with a case in which the duct is widened toward the vehicle transverse direction outer sides in order to avoid interference with the supporting member.

In a third aspect of the present invention, in the first aspect of the present invention, the duct may be structured to include: one root portion that communicates with one delivery port formed at the air conditioner; and a plurality of blow-out portions that are branched-off from the root portion and that communicate respectively with the registers that are provided plurally along the vehicle transverse direction.

In accordance with the above-described aspect, the one root portion, that communicates with the one delivery portion that is formed at the air conditioner, is provided at the duct. Plural blow-out portions are branched-off from this root portion, and are set so as to communicate respectively with registers that are provided plurally along the vehicle transverse direction. In this way, by making there be one root portion of the duct, the space around the root portion of the duct can be utilized effectively.

In a fourth aspect of the present invention, in the first or third aspect of the present invention, the display may be disposed at an upper surface of a central portion in the vehicle transverse direction of the instrument panel.

In accordance with the above-described structure, the display can be made to be large, as compared with a case in which the display is disposed at the center cluster. Further, the degrees of freedom in design of the position of the display improve. Due thereto, the visibility of the display is improved, and the display can be disposed so as to not enter into the direct field of vision.

Advantageous Effects of Invention

As described above, in accordance with the first aspect of the present invention, there is the excellent effect that a deterioration in the ability to efficiently utilize space can be suppressed.

In accordance with the third aspect of the present invention, there is the excellent effect that the space around the root portion of the duct can be utilized effectively.

In accordance with the fourth aspect of the present invention, there is the excellent effect that the visibility of the passenger with respect to the display improves.

BEST MODES FOR CARRYING OUT THE INVENTION

An embodiment of the present invention is described hereinafter with reference to the drawings. Note that arrow FR that is shown appropriately in the drawings indicates the forward direction in the vehicle longitudinal direction, arrow UP indicates the upward direction in the vehicle vertical direction, and arrow W indicates the vehicle transverse direction, respectively.

Structure of Instrument Panel

Figure 1:
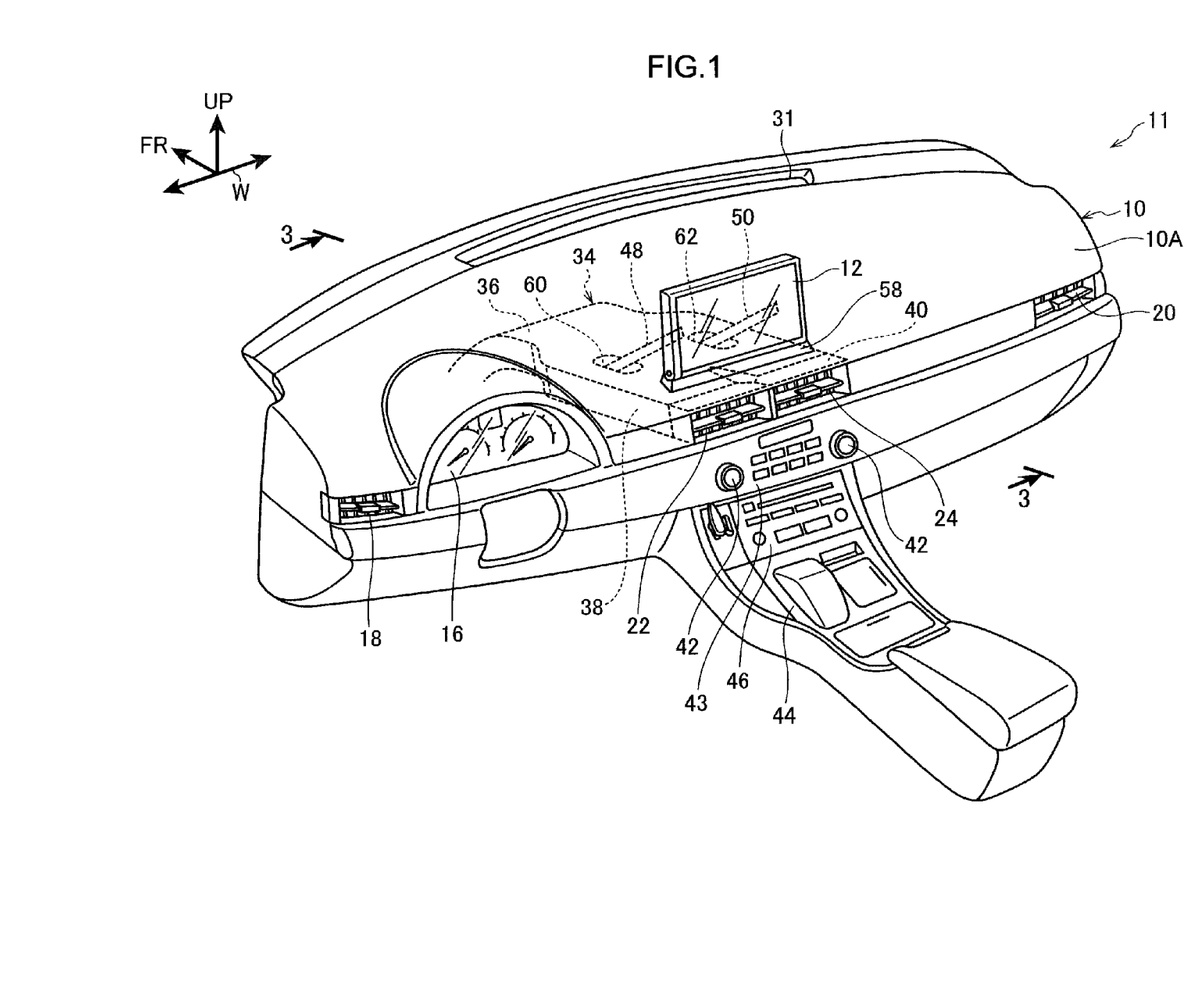
FIG. 1 is a perspective view showing a display, a duct and the like to which an instrument panel structure relating to the present embodiment is applied.
Figure 2:
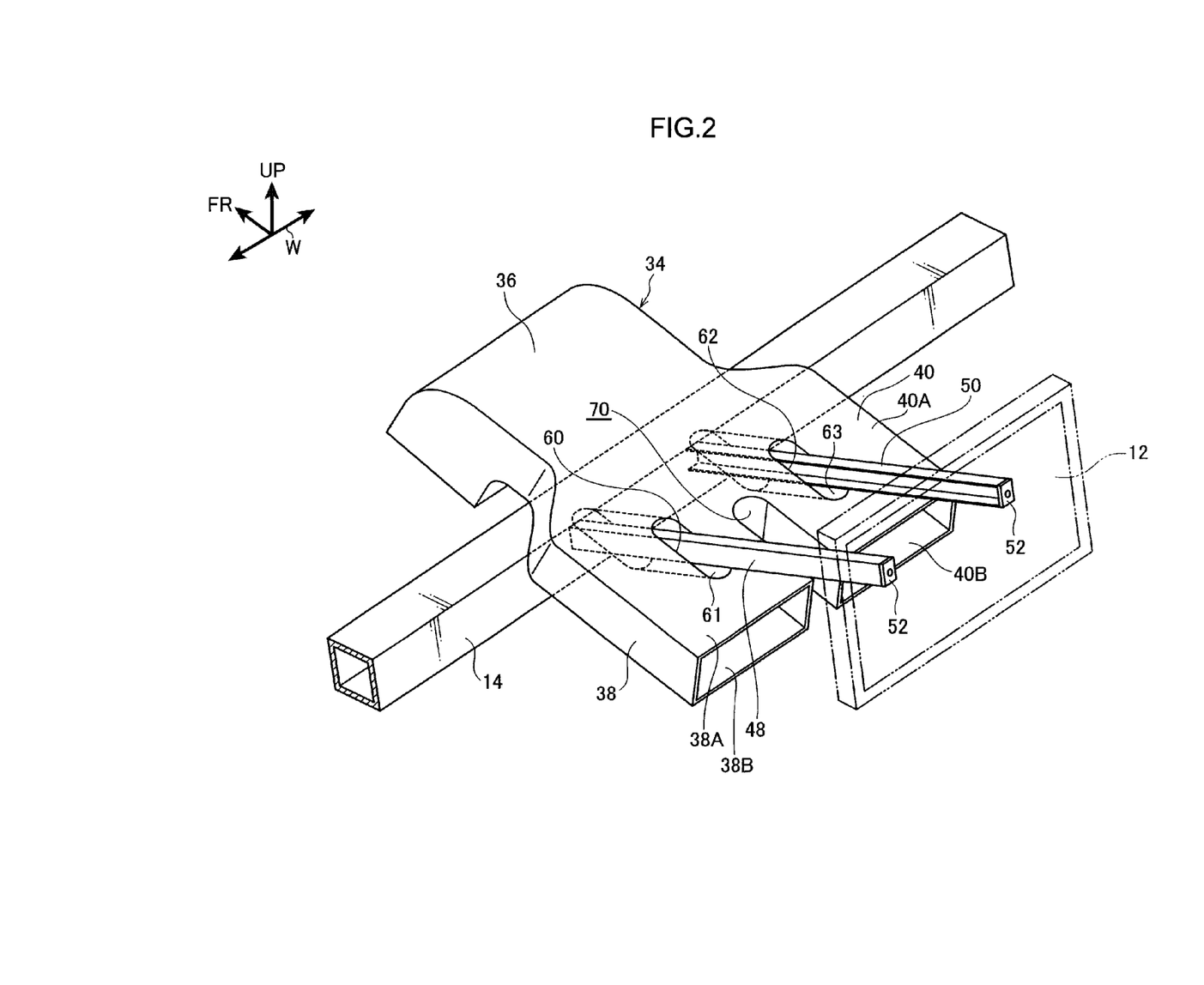
FIG. 2 is a perspective view showing, in an enlarged manner, the display, the duct and the like that are shown in FIG. 1.

A perspective view of an instrument panel 10 (hereinafter called "instrument panel 10"), to which an instrument panel structure relating to the present embodiment is applied, is shown in FIG. 1. Further, a perspective view, in which a display 12, a duct 34 and the like that are main portions of the instrument panel structure are enlarged, is shown in FIG. 2, and a cross-sectional view along line 3-3 of FIG. 1 is shown in FIG. 3.

Figure 3:
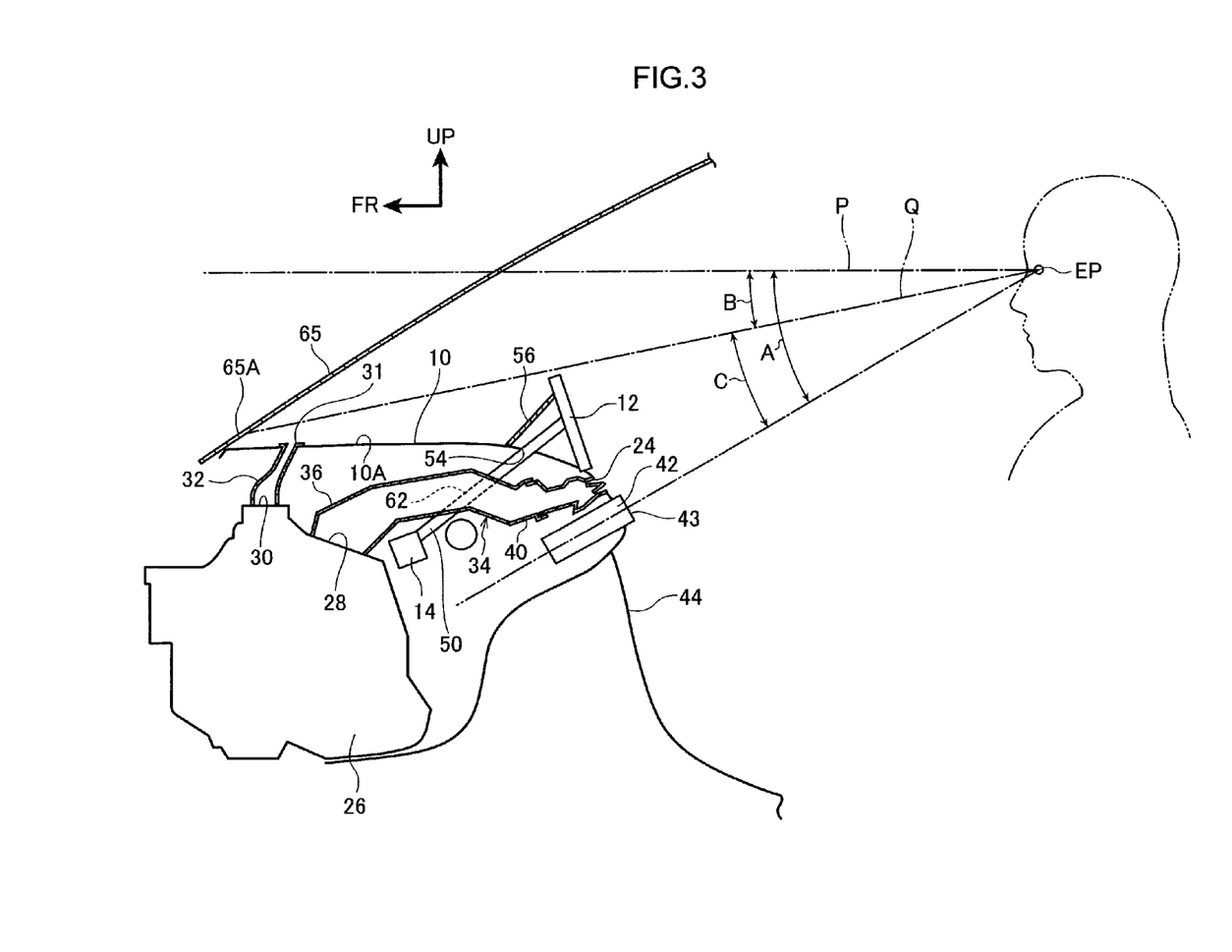
FIG. 3 is a cross-sectional view along line 3-3 of FIG. 1.

As shown in FIG. 1 and FIG. 3, the instrument panel 10 that is provided at the vehicle cabin front portion is mounted to an instrument panel reinforcement 14 (hereinafter called "instrument panel reinforcement 14") that bridges left and right front pillars that are not illustrated, and covers an air conditioner 26 and the like from the vehicle upper side. Note that, here, a combination meter 16 is provided at the vehicle transverse direction left side of the instrument panel 10, and a vehicle 11 is a left-hand drive specification vehicle, but may be a right-hand drive specification vehicle.

Side registers 18, 20 are provided at the vehicle transverse direction both sides of this instrument panel 10 respectively, and a pair of center registers 22, 24 that serve as registers are provided at the vehicle transverse direction central portion of the instrument panel 10. A delivery port 28 for the center registers and a delivery port 30 for the defroster, that serve as delivery ports that feed-out air whose temperature has been adjusted by the air conditioner 26, are provided at the air conditioner 26.

A duct 32 that is connected to a defroster 31 is mounted to the delivery port 30 for the defroster, and the delivery port 30 for the defroster and the defroster 31 communicate via this duct 32. Further, unillustrated ducts are connected to the side registers 18, 20, and these ducts are mounted to unillustrated delivery ports for the side registers that are provided at the air conditioner 26. Namely, these delivery ports for the side registers and the side registers 18, 20 communicate via these ducts.

On the other hand, the duct 34 that is connected to the center registers 22, 24 is mounted to the delivery port 28 for the center registers. One root portion 36 is provided at the duct 24, and this root portion 36 is mounted to the delivery port 28 for the center registers. Further, a duct portion 38 and a duct portion 40 that serve as blow-out portions branch-off from the root portion 36. The duct portion 38 and the duct portion 40 are formed in rectilinear shapes, and the duct portion 38 is connected to the center register 22, and the duct portion 40 is connected to the center register 24. Namely, the delivery port 28 for the center registers and the center register 22 communicate via the duct portion 38, and the delivery port 28 for the center registers and the center register 24 communicate via the duct portion 40.

By the way, the display 12 is provided (to be described later) at an obverse side 10A (the vehicle cabin inner side) of the instrument panel 10 so as to be positioned at the upper surface of the central portion in the vehicle transverse direction of the instrument panel 10. As shown in FIG. 1, a pedestal 58 that is substantially parallelepiped is provided along the vehicle transverse direction at the central portion in the vehicle transverse direction, at the upper surface of the central portion in the vehicle transverse direction of the obverse side 10A of the instrument panel 10. The display 12 is placed on this pedestal 58.

The display 12 is such that, for example, navigation information and vehicle information and the like are displayed thereon, and the center registers 22, 24 are provided beneath the display 12. An air conditioning operation portion 43, at which are provided operation switches 42 that set the temperature and the air volume of the air conditioner 26 and specify the positions of the registers from which air is fed-out, is provided beneath these center registers 22, 24. Namely, the center registers 22, 24 are provided between the display 12 and the air conditioning operation portion 43. Further, beneath the air conditioning operation portion 43, an audio device 46 is provided at a center cluster 44 that is provided at the central portion in the vehicle transverse direction. Note that the audio device 43 may be provided at the position of the air conditioning operation portion 43.

Here, as shown in FIG. 2, a pair of supporting members 48, 50 that are formed in rod shapes (which may be angular or round) are mounted via mounting portions 52 by unillustrated screws or the like to the both sides in the vehicle transverse direction of the reverse surface of the display 12. Namely, the display 12 is supported by these supporting members 48, 50. Because the supporting members 48, 50 are mounted to the instrument panel reinforcement 14, the display 12 is supported at the instrument panel reinforcement 14 via these supporting members 48, 50.

Further, the display 12, that is disposed at the obverse side 10A of the instrument panel 10, is supported by the supporting members 48, 50 that are mounted to the instrument panel reinforcement 14 that extends at the reverse side of the instrument panel 10. Therefore, as shown in FIG. 3, hole portions 54 through which these supporting members 48, 50 pass are formed in the instrument panel 10. Thus, a cover member 56, that covers these hole portions 54 and supporting members 48, 50 from above, is provided at the instrument panel 10, and the hole portions 54 and the supporting members 48, 50 are not exposed to the exterior.

On the other hand, a side sectional view (a cross-sectional view along line 3-3 of FIG. 1), that shows the arrangement of the instrument panel reinforcement 14, the duct 34, the display 12 and the like, is shown in FIG. 3. As shown in FIG. 3, as seen in side view, the duct 34 is disposed between the instrument panel reinforcement 14 and the display 12. Further, this duct 34 and the supporting members 48, 50 are disposed so as to overlap one another as seen in plan view.

Therefore, as shown in FIG. 2, a through-hole 60 through which the supporting member 48 passes is formed in the duct portion 38 of the duct 34, and a through-hole 62 through which the supporting member 50 passes is formed in the duct portion 40. Accordingly, due to the supporting members 48, 50 being made to pass-through the through-holes 60, 62, the supporting members 48, 50 can be made to come-out upward from beneath the duct 34. The angle of the through-holes 60, 62, with respect to the supporting members 48, 50 and the instrument panel reinforcement 14, varies in accordance with the positional relationship between the instrument panel reinforcement 14 and the display 12.

Further, the duct 34 is formed by blow molding, and is formed in a state in which the through-holes 60, 62 do not communicate with the interiors of the duct portions 38, 40. Namely, a top wall 38A and a bottom wall 38B of the duct portion 38 are connected by a tube portion 61, and a top wall 40A and a bottom wall 40B of the duct portion 40 are connected by a tube portion 63. Further, the interiors of the tube portions 61, 63 are the through-holes 60, 62, and the supporting members 48, 50 are passed therethrough, respectively.

Operation/Effects of Instrument Panel Structure

As shown in FIG. 1 and FIG. 2, in the present embodiment, the display 12 is disposed at the upper surface of the central portion in the vehicle transverse direction of the instrument panel 10, and the supporting members 48, 50 that support this display 12 are fixed to the instrument panel reinforcement 14 that extends at the reverse side of the instrument panel 10. Generally, the instrument panel reinforcement 14 is formed by a member that has high strength and rigidity. Therefore, due to the display 12 being supported by the supporting members 48, 50 that are mounted to this instrument panel reinforcement 14, the display 12 can be supported sufficiently even if the display 12 is made to be large and the mass thereof becomes large.

Further, as shown in FIG. 3, the air conditioner 26 is provided at the reverse side of the instrument panel 10, and this air conditioner 26 and the center registers 22, 24, that are provided at the instrument panel 10 (note that the center register 22 (see FIG. 1) is not illustrated in FIG. 3), are connected by the duct 34. Due thereto, the air that is fed-out from the air conditioner 26 passes-through this duct 34 and is blown-out from the center registers 22, 24.

Here, as shown in FIG. 3, as seen in side view, the duct 34 is disposed between the instrument panel reinforcement 14 and the display 12. As shown in FIG. 2, the display 12 is supported by the instrument panel reinforcement 14 via the supporting members 48, 50, and therefore, the supporting members 48, 50 are provided between the instrument panel reinforcement 14 and the display 12, and the supporting members 48, 50 and the duct 34 are set so as to overlap as seen in side view.

Further, these supporting members 48, 50 are set so as to overlap the duct 34 as seen in plan view. Namely, the supporting members 48, 50 must come-out upward from beneath the duct 34 (must be passed-through the duct 34 in the present embodiment). Therefore, here, the through-hole 60 through which the supporting member 48 passes is formed in the duct portion 38, and the through-hole 62 through which the supporting member 50 passes is formed in the duct portion 40.

Further, due to the supporting members 48, 50, that support the display 12, being passed-through the duct portions 38, 40 respectively, these supporting members 48, 50 are provided so as to overlap the duct 34 as seen in plan view. Due thereto, the ability to efficiently utilize space improves as compared with, for example, a case that is not illustrated but in which the duct 34 is widened toward the vehicle transverse direction outer sides in order to avoid interference with the supporting members 48, 50. Further, because this duct 34 is formed by blow molding, these through-holes 60, 62 can be formed easily. Moreover, as shown in FIG. 2, at the duct 34, by making the duct portion 38 and the duct portion 40, that are connected to the center registers 22, 24, be one at the root portion 36, the width thereof can be made to be more narrow than the dimension in the vehicle transverse direction of the duct portion 38 and the duct portion 40, and the space around the root portion 36 can be utilized effectively.

Further, as shown in FIG. 1, the display 12 is disposed at the upper surface of the central portion in the vehicle transverse direction of the instrument panel 10. Due thereto, the display 12 can be made to be larger by an amount by which problems, such as interference with the operation switches 42 and the like, or the like, do not arise, as compared with a case that is not illustrated but in which, for example, the display 12 is disposed at the center cluster 44. Further, the degrees of freedom in design of the position of the display 12 improve. Due thereto, the visibility of the display 12 can be improved, and the display 12 can be disposed so as not enter into the direct field of vision.

Concretely, as shown in FIG. 3, a horizontal line, whose reference is an eye point EP that is determined by the seat position, is reference line P. Further, the visibility can be made to be good if the display 12 is disposed in region A that is within a range that is approximately 30° downward from this reference line P. On the other hand, if the display 12 is disposed at the inner side of a straight line Q that connects the eye point EP and a ceramic line upper end 65A of a windshield 65 (within region B that is structured by the reference line P and the straight line Q; the so-called direct field of vision), this display 12 enters into the direct field of vision, and the region B of the direct field of vision becomes narrow.

Therefore, by placing the display 12 within a region C in which the region B that is the direct field of vision is excluded from the region A that is within a range of 30° from the reference line P, the visibility of the display 12 can be improved and the direct field of vision is not obstructed.

Further, by placing the operation switches 42 of the air conditioning operating portion 43 within the region C, the visibility of these operation switches 42 improves as compared with, for example, a case in which the operation switches 42 are disposed at a position that is more than 30° downward from the reference line P.

Other Embodiments (1) In the above-described embodiment, as shown in FIG. 1, the pedestal 58 that is substantially parallelepiped is provided along the vehicle transverse direction at the upper surface of the central portion in the vehicle transverse direction of the obverse side 10A of the instrument panel 10, and the display 12 is placed on this pedestal 58. However, the display 12 may be provided with a so-called tilting function.

In this case, for example, although not illustrated, hinge mechanisms may be provided at the mounting portions 52 of the supporting members 48, and the display 12 may be tilted by these hinge mechanisms. Further, it may be made such that sliding resistance is obtained between the display 12 and the pedestal 58, and the display 12 may be positioned at a predetermined position by the sliding resistance. Due thereto, the display 12 can be adjusted to a slope at which it is not affected by reflection of exterior light.

Figure 4:
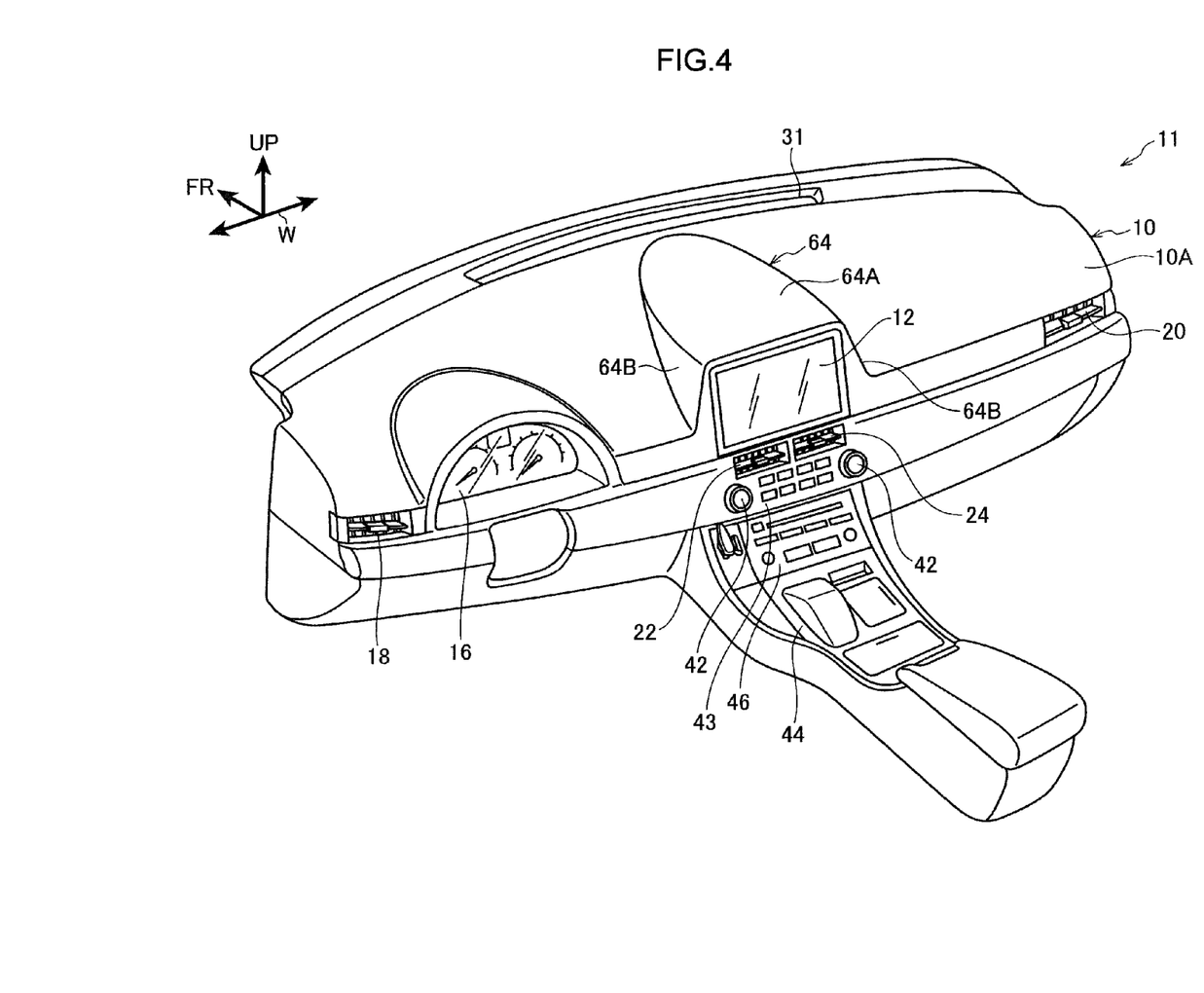
FIG. 4 is a perspective view showing a display to which an instrument panel structure relating to another embodiment (2) is applied.

(2) Further, in the present embodiment, it suffices to place the display 12 at the instrument panel 10, and therefore, the present invention is not limited to the above-described structure. In FIG. 1, the display 12 is in a state of projecting-out from flush with the obverse side 10A of the instrument panel 10. However, for example, as shown in FIG. 4, at the instrument panel 10, a protruding portion 64 may be provided at the portion at which the display 12 is provided, and the display 12 may be fit into this protruding portion 64. Here, an upper surface 64A of the protruding portion 64 is formed to be flat toward the front end side of the instrument panel 10, and side walls 64B of the protruding portion 64 are standing walls that stand-up substantially vertically from the surface of the instrument panel 10.

In this way, by providing the protruding portion 64 in which the display 12 is fit, the luxurious feel of the instrument panel 10 can be rendered. Namely, this protruding portion 64 can be used as a design, and the shape of the protruding portion 64 can be changed accompanying the design of the vehicle.

Note that, here, because the supporting members 48, 50 (see FIG. 2) are disposed within the protruding portion 64, the hole portions 54 (see FIG. 3) for the supporting member 48, 50 to pass-through are not needed at the instrument panel 10. Further, the cover 56 (see FIG. 3) that covers these supporting members 48, 50 and hole portions 54 also is not needed.

Figure 5:
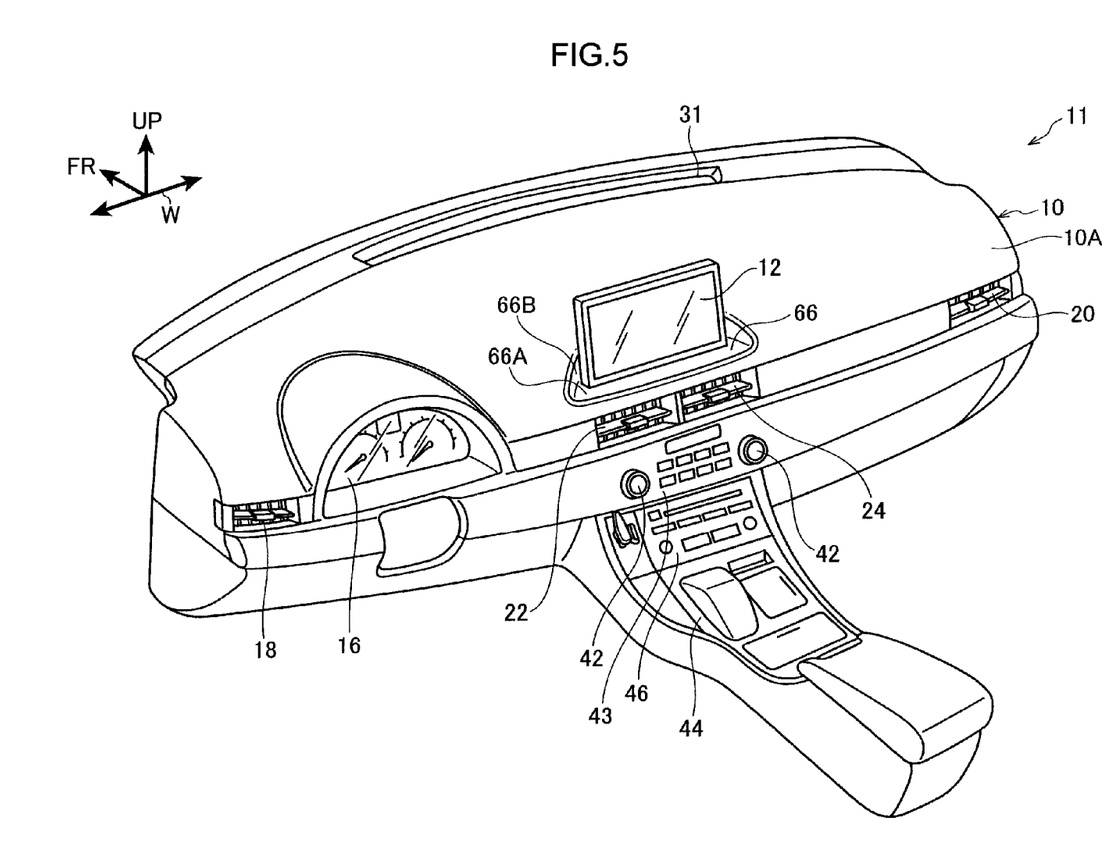
FIG. 5 is a perspective view showing a display to which an instrument panel structure relating to another embodiment (3) is applied.

(3) Further, as shown in FIG. 5, an accommodating recess portion 66 may be provided in the instrument panel 10, and the display 12 may be disposed within this accommodating recess portion 66. The accommodating recess portion 66 has a seat surface 66A that is formed substantially horizontally from the vehicle rear portion toward the vehicle front, and a standing wall 66B that is shaped as a circular hole is formed at the vehicle front portion of the seat surface 66A. Further, the supporting members 48, 50 (see FIG. 2) may pass-through this standing wall 66B.

Figure 6:
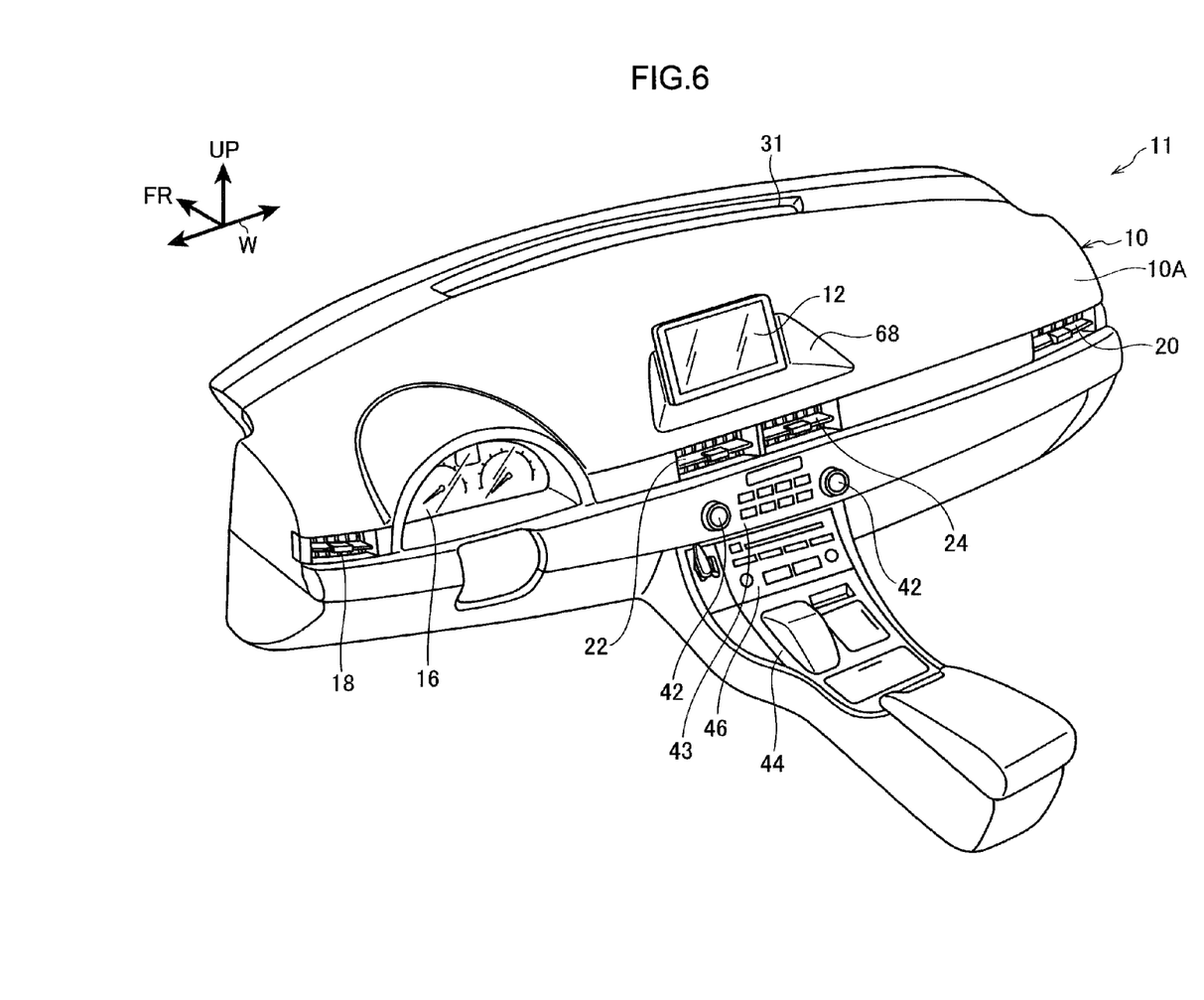
FIG. 6 is a perspective view showing a modified example of FIG. 5.

Here, in a case in which the display 12 is a touch panel, it is better to set the display 12 such that the display 12 is disposed at the vehicle rear side of the instrument panel 10. However, in a case in which the display 12 is not a touch panel type display and is a remote control type display, as shown in FIG. 6, the display 12 can be disposed further toward the vehicle front side of the instrument panel 10 than the touch panel type display 12 (see FIG. 5).

In this way, in a case in which the display 12 is disposed at the vehicle front side of the instrument panel 10, although not illustrated, the angle in the vehicle transverse direction whose reference is the eye point EP (see FIG. 3) is narrow as compared with a case in which the display 12 is disposed at the vehicle rear side of the instrument panel 10 as shown in FIG. 5. Therefore, the visibility of the display 12 improves. However, because the display 12 is placed at the vehicle front side of the instrument panel 10, an accommodating recess portion 68 is formed to be larger than the accommodating recess portion 66 (see FIG. 5).

Supplement to Embodiment (1) Note that, in the present embodiment, as shown in FIG. 2, at the duct 34, the through-hole 60 is formed in the duct portion 38 and the supporting member 48 is made to pass-through this through-hole 60, and further, the through-hole 62 is formed in the duct portion 40 and the supporting member 50 is made to pass-through this through-hole 62. However, it suffices for at least portions of the supporting members 48, 50 to be provided rectilinearly so as to overlap the duct 34 as seen in plan view. Therefore, depending on the pitch of the supporting member 48 and the supporting member 50 and the pitch of the center register 22 and the center register 24, for example, the supporting member 48 or the supporting member 50 may be structured so as to pass-through the duct portion 38 or the duct portion 40.

(2) Further, in the present embodiment, the two supporting members 48, 50 were used as shown in FIG. 2, but there may be one supporting member (not shown). In this case, for example, this supporting member is formed in a T-shape, and the mounting portion to the instrument panel reinforcement 14 is made to be at one place, and the mounting portions to the display are made to be at two places in the vehicle transverse direction. Further, the supporting member is provided between the duct portion 38 and the duct portion 40 of the duct 34.

In FIG. 2, because a gap 70 is provided between the duct portion 38 and the duct portion 40, by utilizing this gap 70 and providing a supporting member within this gap 70, there is no need to form the through-holes 60, 62 in the duct portion 38 and the duct portion 40. Namely, unillustrated recesses may be provided in the side walls 38A, 40A of the duct portion 38 and the duct portion 40, and the supporting member may be disposed within theses recesses, and the supporting member may be made to come-out upward from beneath the duct portion 38 and the duct portion 40. Note that a recess in which the supporting member is disposed may be provided in either one of the duct portion 38 and the duct portion 40.

(3) Further, in the present embodiment, at the duct 34, there is made to be the one root portion 36 that is connected to the air conditioner 26, and the root portion 36 is branched off into the duct portion 38 and the duct portion 40 in correspondence with the center registers 22, 24. However, depending on the size of the air conditioner 26 and the place at which it is disposed and the like, there may be two root portions. Namely, a duct may be provided for each of the center registers 22, 24.

Although an embodiment of the present invention has been described above, the present invention is not limited to the above description and, other than the above, may of course be implemented by being modified in various ways within a scope that does not deviate from the gist thereof.

The invention claimed is:

1. An instrument panel structure comprising:
   an instrument panel reinforcement that is provided at a reverse side of an instrument panel, and that extends along a vehicle transverse direction;
   a supporting member that supports a display disposed at an upper surface of the instrument panel, and that is mounted at a central portion, in the vehicle transverse direction, of the instrument panel reinforcement; and
   a duct that connects an air conditioner provided at the reverse side of the instrument panel and a register provided at the instrument panel, and that is positioned between the instrument panel reinforcement and the display and overlaps the supporting member as seen in side view, the supporting member being provided rectilinearly such that at least a part thereof overlaps the duct as seen in plan view, and at which a through-hole through which the supporting member passes is formed in a duct main body, wherein the through-hole includes a tube portion that extends between a top of the duct and a bottom of the duct so that the through-hole does not communicate with an interior of the duct.

2. The instrument panel structure of claim 1 wherein the duct is structured to include:
   one root portion that communicates with one delivery port formed at the air conditioner; and
   a plurality of blow-out portions that are branched-off from the root portion and that communicate respectively with the registers that are provided plurally along the vehicle transverse direction.

3. The instrument panel structure of claim 1, wherein the display is disposed at an upper surface of a central portion in the vehicle transverse direction of the instrument panel.

4. The instrument panel structure of claim 2, wherein the display is disposed at an upper surface of a central portion in the vehicle transverse direction of the instrument panel.

5. The instrument panel structure of claim 1, wherein the supporting member extends between the display and the instrument panel reinforcement.

\* \* \* \* \*